(12) United States Patent
Hurley

(10) Patent No.: US 7,216,636 B2
(45) Date of Patent: May 15, 2007

(54) EVAPORATIVE SYSTEM INTEGRITY MONITOR

(75) Inventor: Darrin W Hurley, Flat Rock, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 232 days.

(21) Appl. No.: 11/124,696

(22) Filed: May 9, 2005

(65) Prior Publication Data
US 2006/0249126 A1 Nov. 9, 2006

(51) Int. Cl.
*F02M 37/04* (2006.01)
(52) U.S. Cl. .................. 123/519; 123/520
(58) Field of Classification Search ............. 123/516, 123/518, 519, 520
See application file for complete search history.

(56) References Cited

U.S. PATENT DOCUMENTS 5,383,437 A * 1/1995 Cook et al. .............. 123/520
6,823,850 B1 11/2004 Hurley
6,928,991 B2 8/2005 Hurley
7,040,301 B2 * 5/2006 Perry et al. .............. 123/520
7,047,950 B2 * 5/2006 Hurley .................... 123/516

* cited by examiner

Primary Examiner—Thomas Moulis
(74) Attorney, Agent, or Firm—Thomas A. Jurecko

(57) ABSTRACT

An evaporative emission control and leak detection system for a vehicle is provided. The system includes an integrated valve module in fluid communication with a carbon canister and atmosphere. The module is arranged to vent the system when exposed to predetermined high negative and positive pressure conditions. The module includes a switch mechanism having a spring biasing member arranged to bias the switch mechanism to an open position. The switch is operable to indicate when the system is in a low negative pressure condition. The switch also includes a negative pressure valve coupled to a fluid passage between the canister, the atmosphere and the switch, and a positive pressure valve coupled to a fluid passage between the canister and atmosphere that bypasses the negative pressure valve and switch. The negative and positive pressure valves are positioned in a stacked arrangement in the integrated valve module.

10 Claims, 4 Drawing Sheets

EVAPORATIVE SYSTEM INTEGRITY MONITOR

FIELD OF THE INVENTION

The present invention relates generally to evaporative emission control for a motor vehicle, and, more particularly, to an improved leak detection and control arrangement for an evaporative emission system of a motor vehicle.

BACKGROUND OF THE INVENTION

In a conventional evaporative emission system, an emission control device is utilized in connection with a charcoal canister to recover fuel vapor from a refueling event and selectively purge this fuel vapor from the charcoal canister into the engine. The emission control device is further utilized to perform leak detection tests to verify the integrity of the evaporative emission system and also provide pressure relief of the evaporative emission system. The emission control device is typically connected to an engine and a fuel tank and also includes a connection to the atmosphere. In general, conventional emission control devices provide control of various valves under specific engine operating conditions to perform system leak tests as well as system pressure relief. An example of such an evaporative emission system is disclosed in commonly owned U.S. Pat. No. 6,073,487 which is hereby incorporated by reference in its entirety.

While such conventional systems work for their intended purpose, packaging of numerous system components and solenoids undesirably increase cost and complexity. Thus, there is a need for an evaporative emission system that overcomes the aforementioned and other disadvantages.

SUMMARY OF THE INVENTION

Accordingly, an evaporative emission control and leak detection system for a motor vehicle is provided. The system is in fluid communication with a fuel tank, an engine, and a carbon canister. The system includes an integrated valve module that is in fluid communication with the carbon canister and the atmosphere. The module is arranged to vent the system when exposed to predetermined high negative and positive pressure conditions. The module includes a switch mechanism having a calibrated spring that is arranged to bias the switch mechanism to an open position. The switch is operable to indicate when the system is in a low negative pressure condition. The module also includes a one-way high negative pressure valve coupled to a fluid passage between the carbon canister, the atmosphere and the switch, and a one-way high positive pressure valve coupled to a fluid passage between the carbon canister and the atmosphere that bypasses the high negative pressure valve and the switch. The high negative and high positive pressure valves are positioned in a stacked arrangement in the integrated valve module.

BRIEF DESCRIPTION OF THE DRAWINGS

Other aspects, features, and advantages of the present invention will become more fully apparent from the following detailed description of the preferred embodiment, the appended claims, and in the accompanying drawings in which:

DETAILED DESCRIPTION OF THE PREFERRED EMBODIMENT

Figure 1:
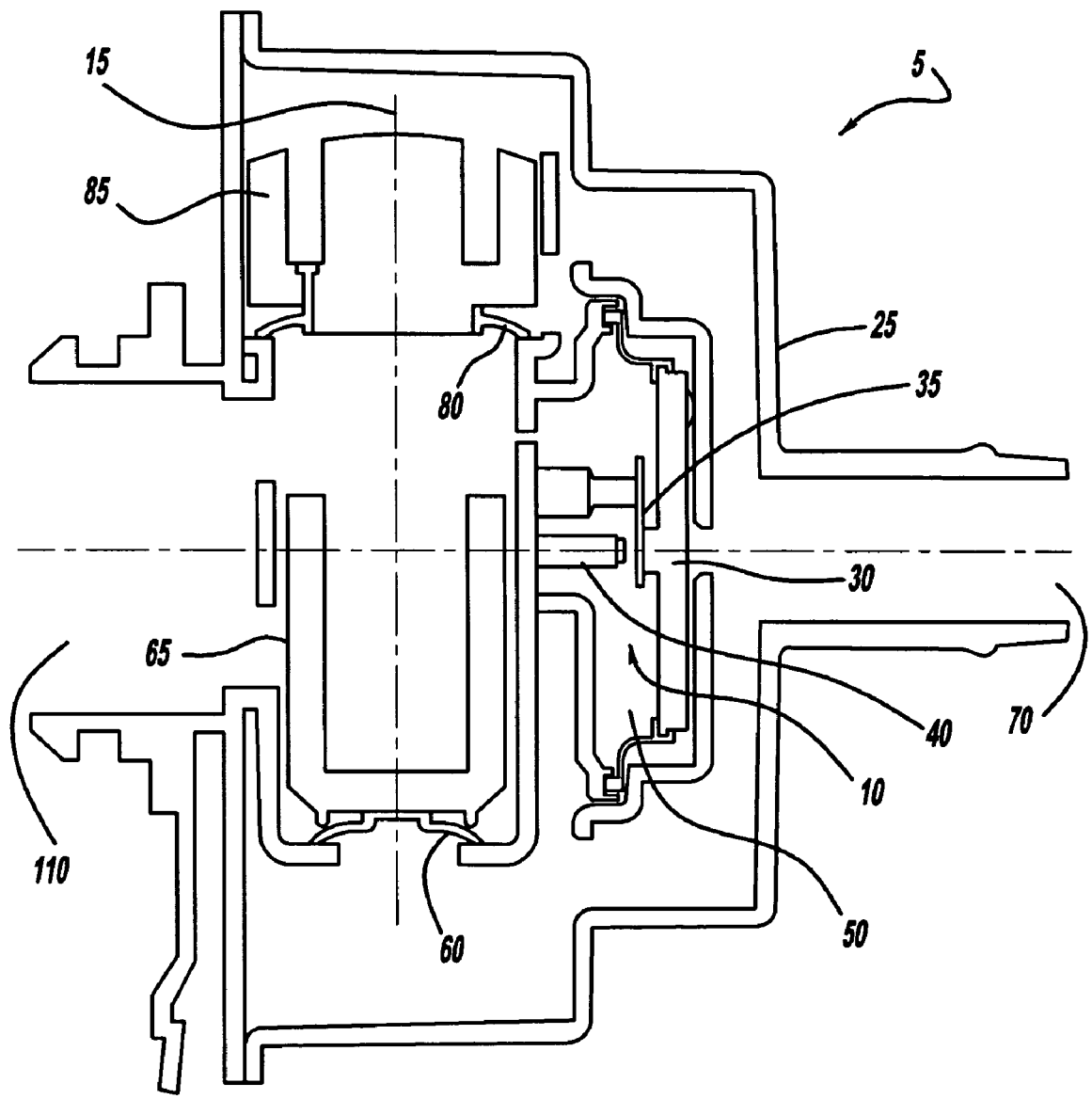
FIG. 1 illustrates a cross sectional view of an exemplary embodiment of an integrity module in accordance with the present invention.

Referring now to the drawings, FIG. 1 illustrates a cross section of an exemplary embodiment of emission control module 5 with valve components packaged in a vertical stacked arrangement along a common axis 15. This vertical stacked configuration provides for, among other things, easy assembly of the valve components in a manufacturing process.

Figure 2:
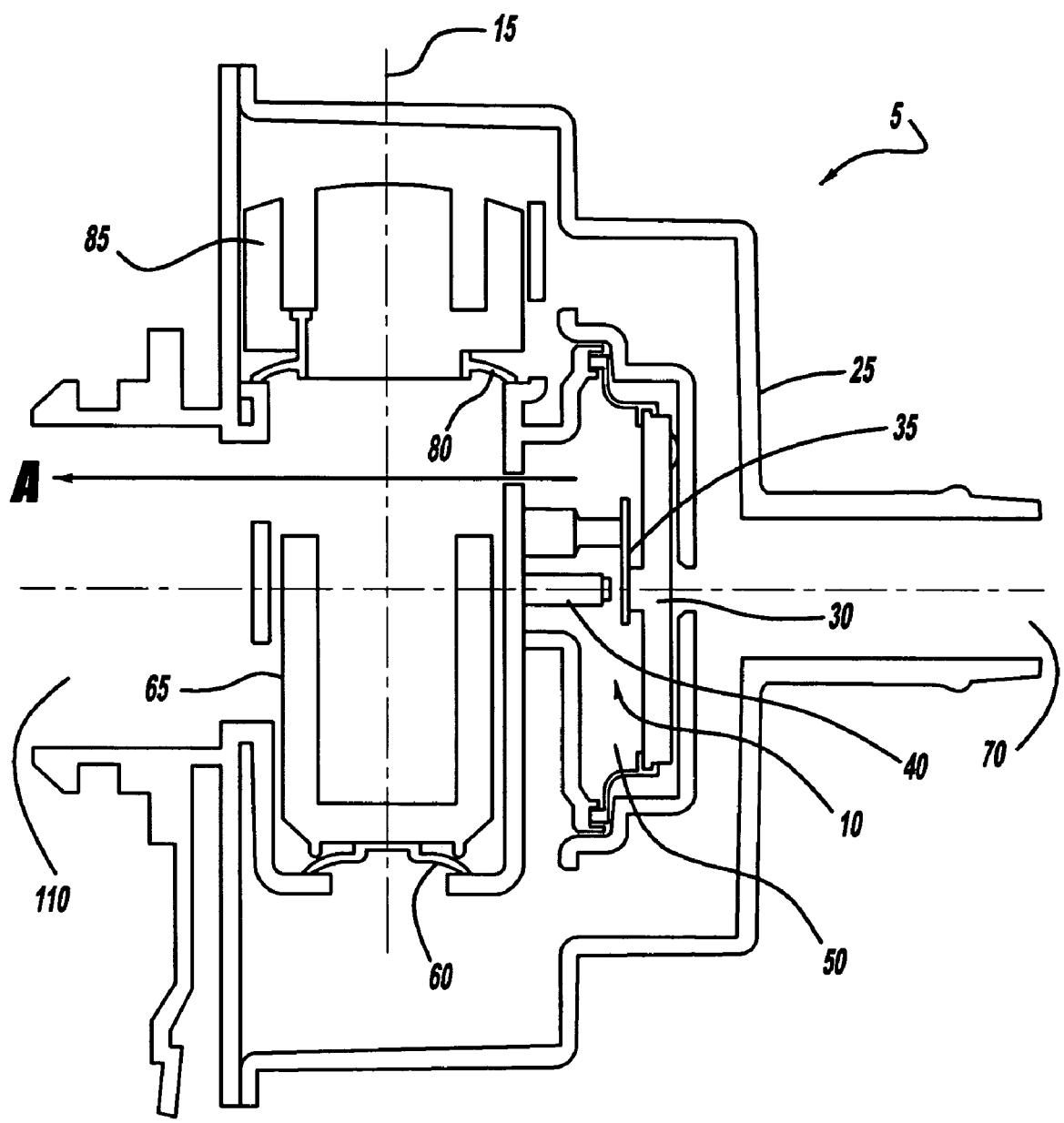
FIG. 2 illustrates a cross sectional view of the exemplary embodiment under a low vacuum condition with switch activation in accordance with the present invention.

In accordance with one aspect of the present invention and referring to FIGS. 1 and 2, a switch mechanism 10 is provided for performing low level vacuum leak detection testing when the vehicle is not in operation. The switch mechanism 10 comprises a biased-open low vacuum switching element 30, such as a spring-biased diaphragm illustrated in FIG. 1, arranged to engage an electrical connector 40. Low vacuum switch element 30 is biased open by flat spring element 35 as best shown in FIG. 1.

In operation and referring to FIG. 2, the low vacuum switch element 30 is arranged to overcome flat spring element 35 and translate to contact electrical connector 40 in response to a predetermined low vacuum condition generated by vehicle operation. Flat spring element 35 is calibrated such that upon exposure to a low vacuum condition threshold through carbon canister port 110, the low vacuum switch element 30 will engage the electrical connector 40 and thereby complete a circuit for low level leak test verification. The pattern of vacuum flow for low vacuum leak test verification is illustrated by arrow A in FIG. 2. If the low vacuum condition is such that the biasing force of spring element 35 can not be overcome, switch element 30 will not contact electrical connector 40 and will be in an open position as best shown in FIG. 1.

In accordance with another aspect of the present invention, the emission control apparatus further includes a high negative pressure valve 60 positioned relative to an atmospheric port 70 and carbon canister port 110. It should be appreciated that the carbon canister may be coupled to the integrity module or arranged in fluid communication with the integrity module via carbon canister port 110. High negative pressure valve 60 is arranged in conjunction with the low vacuum switch element 30 to allow for high vacuum leak detection testing, high vacuum regulation, and canister purging. High negative pressure valve 60 further includes a gravity biasing member 65 arranged to bias valve 60 to a closed position. It should be appreciated that the threshold to overcome flat spring element 35 in a low vacuum leak detection mode is less than that required to overcome high negative pressure valve 60 that is biased to a closed or sealed position by gravity biasing member 65.

Figure 3:
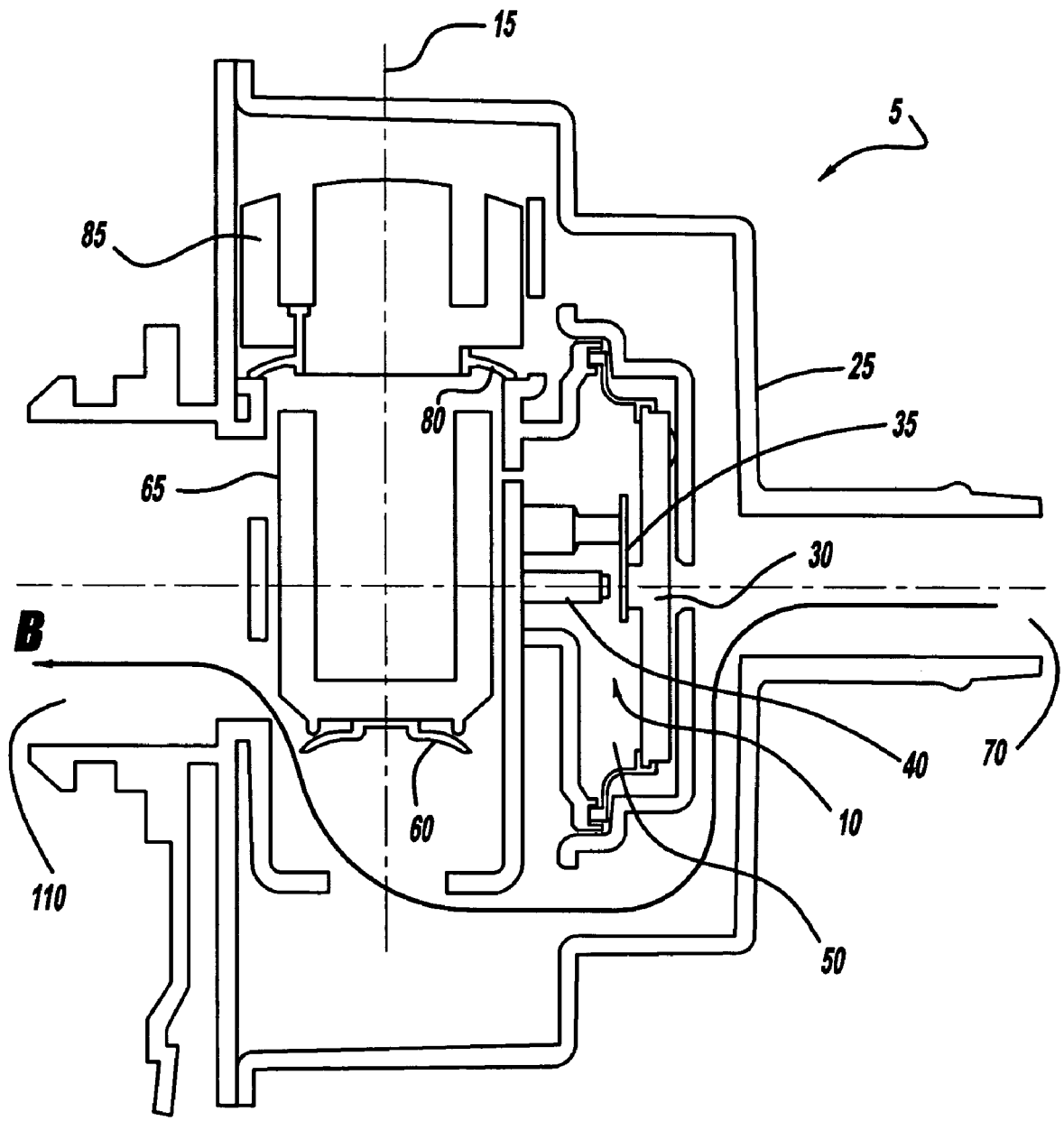
FIG. 3 illustrates a cross sectional view of the exemplary embodiment under a high vacuum relief condition in accordance with the present invention.

In operation and referring to FIG. 3, when a high vacuum leak test is desired to be performed, an engine purge valve (not shown) is operated to close a connection between the emission control apparatus 5 and an engine (not shown) to create a high vacuum condition in the evaporative emission system. Initially, when the high vacuum condition is above a predetermined high vacuum threshold, high negative pressure valve 60 is in an open position. Subsequently operating the purge valve to stop the vacuum draw thereby allows the high vacuum condition to start to bleed down. Stopping the vacuum draw causes the amount of vacuum to drop below the threshold of the high vacuum threshold of gravity biasing member 65 of high negative pressure valve 60 and thus allowing for it to close. As the vacuum bleeds down to a level below the low vacuum threshold of flat spring element 35, the low vacuum switch element 30 is arranged to disengage from the electrical connector 40 and open the circuit. The rate at which the vacuum bleeds down from the high vacuum threshold to a level that opens the circuit is measured and compared to a calibrated value for high vacuum leak test verification. Fluid flow distribution for the high vacuum leak test verification and regulation is shown by arrow B in FIG. 3.

Figure 4:
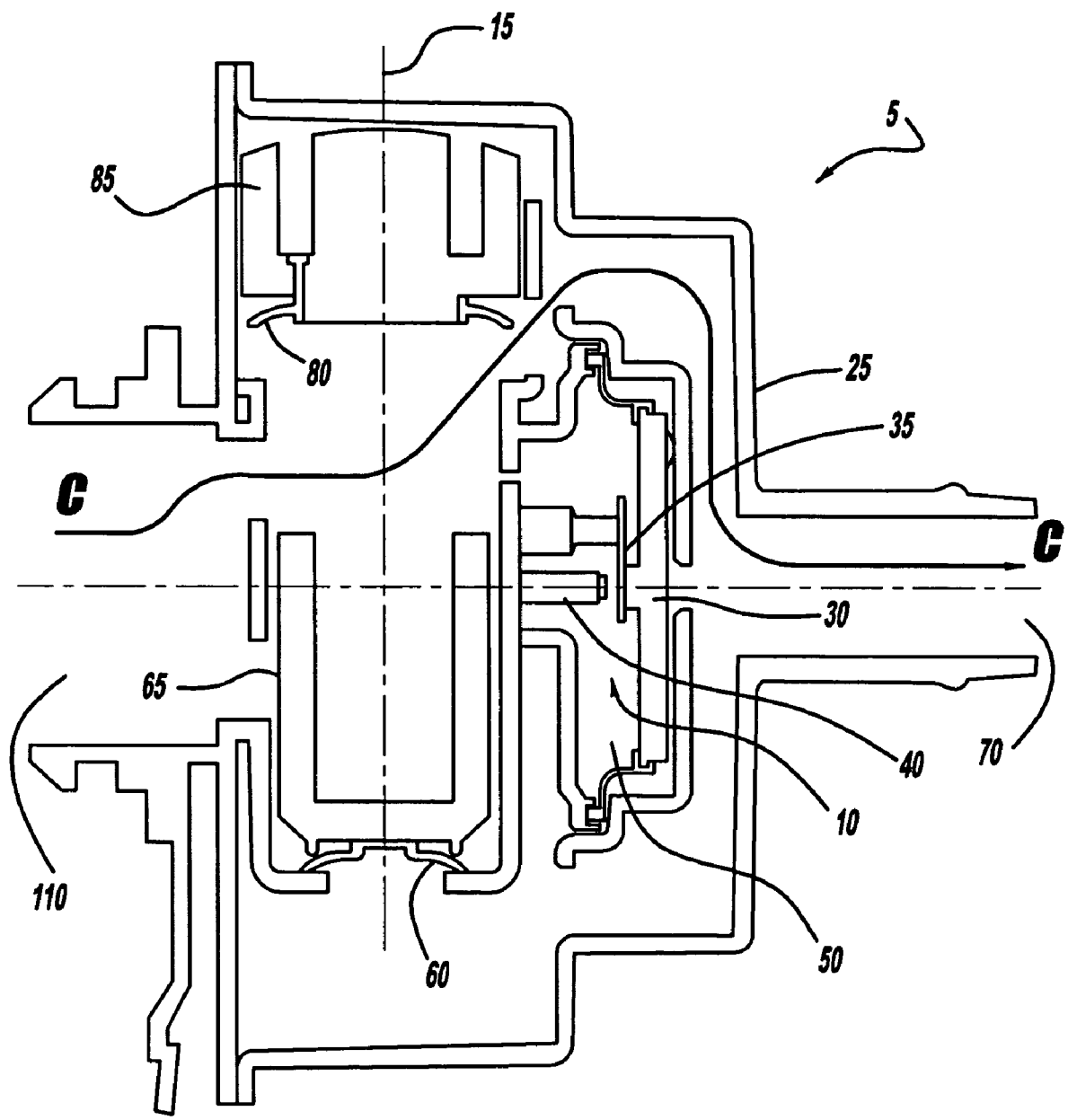
FIG. 4 illustrates a cross sectional view of the exemplary embodiment under a pressure relief and/or refueling bypass condition in accordance with the present invention.

In accordance with another aspect of the present invention and referring to FIG. 4, emission control module 5 further includes a high positive pressure valve 80. High positive pressure valve 80 is operably connected to a carbon canister (not shown) at the canister interface port 110 and the atmosphere at atmospheric port 70 while bypassing the high negative pressure valve and the low vacuum switching element 30. High positive pressure valve 80 includes a gravity biasing member 85 and is arranged to provide positive pressure relief and regulation and refueling bypass if engine pressure exceeds a predetermined high positive pressure threshold of high positive pressure valve 80. A fluid flow pattern for positive pressure relief is shown by arrow C in FIG. 4.

Incorporation of vacuum relief and regulation capability into the emission control apparatus provides for elimination of a separate, remotely packaged solenoid valve typically used in conventional evaporative emission control systems. In addition, by providing a low vacuum switch element having a calibrated flat spring in accordance with this invention, the need for a low negative pressure check valve is obviated thereby simplifying the module and assembly process.

In addition, high negative pressure valve 60 and associated gravity biasing member 65 as well as high positive pressure valve 80 and associated gravity biasing member 85 are sized with diameters such that they can not be incorrectly assembled. More specifically, both valves are circularly shaped and thus can be inserted into housing 25 along axis 15 in any rotational orientation. Valve 80 and biasing member 85 are larger in diameter than valve 60 and biasing member 65. Each valve and its associated member are also positioned in housing 25 in such a manner that an outer diameter of each valve and its associated biasing member is in very close proximity to chamber structure housing 25. Thus, high positive pressure valve 80 and biasing member 85 have a diameter too large to fit in the designated assembly position of high negative pressure valve 60 and associated biasing member 65.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An evaporative emission control and leak detection system for a motor vehicle, the system in fluid communication with emissions from a fuel tank, an engine and a carbon canister, the system comprising:
   an integrated valve module in fluid communication with the carbon canister and the atmosphere, and arranged to vent the system when exposed to predetermined high negative and positive pressure conditions, the module including:
      a switch mechanism operable to indicate when the system is in a low negative pressure condition, the switch mechanism including a spring for biasing the switch to an open position;
      a one-way high negative pressure valve coupled to a fluid passage between the carbon canister, the atmosphere and the switch; and
      a one-way high positive pressure valve coupled to a fluid passage between the carbon canister and the atmosphere that bypasses the high negative pressure valve and the switch;
      wherein the high negative and high positive pressure valves are positioned in a stacked arrangement in the integrated valve module.

2. The system of claim 1, wherein the switch mechanism is arranged to provide low level system leak test verification, the switch mechanism biased to an open position unless a negative pressure exceeding a predetermined low negative pressure threshold is present in the system.

3. The system of claim 1, wherein the module further comprises a chamber in fluid communication with the high negative pressure valve, the canister and the atmosphere, and wherein the switch mechanism is positioned within the chamber.

4. The system of claim 1, wherein the switch mechanism further comprises a diaphragm member coupled to the spring and an electrical connector, the diaphragm member arranged to contact the electrical connector upon being exposed to a negative pressure condition sufficient to overcome a predetermined threshold of the spring.

5. The system of claim 1, wherein the high negative pressure one-way valve includes a gravity biased valve member and is arranged to provide high negative system pressure relief and regulation, the high negative pressure valve biased to a closed position unless a negative pressure exceeding a predetermined high negative pressure threshold is present in the system.

6. The system of claim 1, wherein the high positive pressure one-way valve includes a gravity-biased valve member and is arranged to provide high positive pressure system relief, the high positive pressure valve biased to a closed position unless a positive pressure exceeding a predetermined high positive pressure threshold is present in the system.

7. The system of claim 1, wherein the high positive pressure one-way valve is further arranged to provide pressure relief for the system during refueling of the fuel tank.

8. The system of claim 1, wherein the carbon canister is coupled to the integrated valve module.

9. The system of claim 1, wherein the valves are non-interchangeably positioned in a stacked arrangement in the integrated valve module.

10. The system of claim 1, wherein the valves are non-interchangeably positioned in a stacked arrangement along a common axis in the integrated valve module.

* * * * *